G. S. MELCHER.
PRESSURE REGULATOR.
APPLICATION FILED MAR. 13, 1917.
1,265,937.
Patented May 14, 1918.
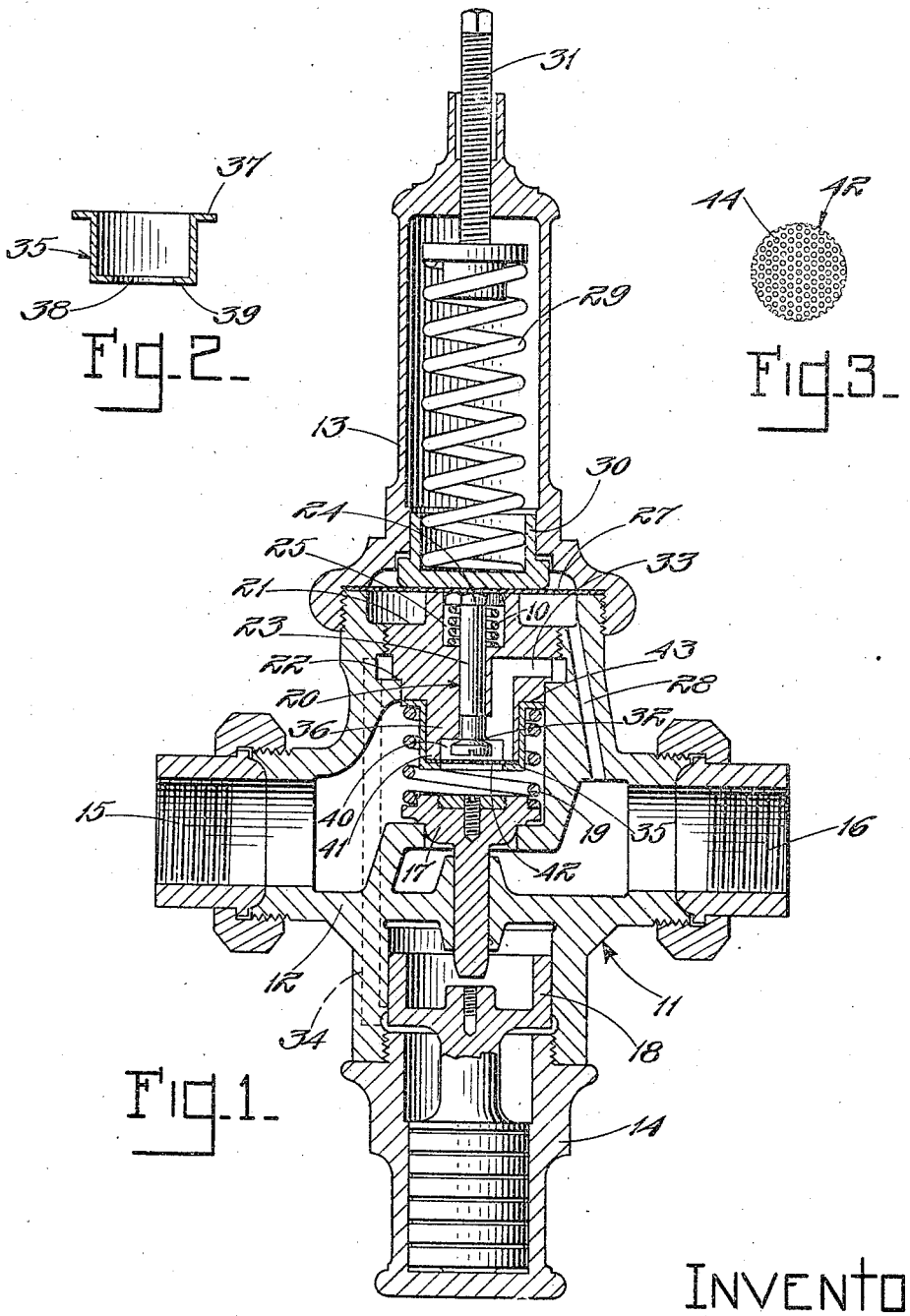
INVENTOR:
George S. Melcher
by Macleod, Calver, Copeland & Dike
Attys

UNITED STATES PATENT OFFICE.

GEORGE S. MELCHER, OF SHARON, MASSACHUSETTS, ASSIGNOR TO CHARLES W. McCONNEL, OF BOSTON, MASSACHUSETTS, ELDON MACLEOD, OF WESTWOOD, MASSACHUSETTS, AND FANNIE B. LOOK, OF NORTHAMPTON, MASSACHUSETTS, TRUSTEES, DOING BUSINESS UNDER THE NAME OF MASON REGULATOR COMPANY.

PRESSURE-REGULATOR.

1,265,937.  Specification of Letters Patent.  Patented May 14, 1918.

Application filed March 13, 1917. Serial No. 154,605.

*To all whom it may concern:*

Be it known that I, GEORGE S. MELCHER, a citizen of the United States, residing at Sharon, county of Norfolk, State of Massachusetts, have invented a certain new and useful Improvement in Pressure-Regulators, of which the following is a specification, reference being had therein to the accompanying drawings.

My invention relates to auxiliary operated pressure regulators, such as reducing valves or the like, and has for its object to provide means for improving the reliability, accuracy of regulation, and excessive wear of moving parts of these devices. As is well known to those skilled in the art, the main valve of auxiliary operated fluid pressure regulators is controlled by an auxiliary valve which is in turn controlled by a diaphragm subjected to the pressure of a spring or the like on one side balanced by the pressure which is being regulated on the other side. Inasmuch as the movement of the auxiliary valve depends upon a slight variation one way or the other between these pressures, the force for moving the said valve is necessarily very slight, depending entirely upon the accuracy of the operation of the device. I have found that in the past the sensitive operation of the auxiliary valve has caused a good deal of trouble owing to the tendency of the valve to stick due to foreign substances in the steam, in the form of dirt, scale or the like, so that the regulator does not operate positively.

One object of my present invention is to provide means for protecting the auxiliary valve from dirt, and for preventing the accumulation of scale, iron rust, etc., on the valve, so that it is always free to operate easily and will move under the influence of very light pressures.

Another object of my invention is to so arrange the strainer in combination with the other parts of the regulator that the strainer is continually scoured by the passage of fluid through the main valve, and is consequently kept free from an accumulation of dirt and other impurities so that a free passage of fluid to the auxiliary valve is provided. Furthermore, the strainer is so located in the main valve passage that the free passage of fluid through the main valve is not interfered with.

A further object of my invention is to so arrange the parts that the strainer member may be readily removed and replaced by a new one if at any time it should become necessary to do so.

For the purpose of illustrating my invention, I have shown the device in connection with a reducing valve which is one type of fluid pressure regulator with which it is particularly designed to be employed.

My invention will be fully understood when taken in connection with the accompanying drawings and the novel features thereof will be pointed out and clearly defined in the claims at the close of this specification.

In the drawings, Figure 1 is an elevation in section of a reducing valve provided with a device embodying my invention.

Fig. 2 is a detail in section of the strainer housing employed.

Fig. 3 is a plan view of a perforated strainer disk employed in the device.

Having reference to the drawings, there is shown at 11 a reducing valve of a well known auxiliary operated type. It comprises a main body 12 on which is mounted a spring case 13 and beneath which is secured a dash pot 14. The main body 12 is provided with the usual inlet and outlet passages 15 and 16, the flow of fluid through which is controlled by a main valve 17 actuated by a piston 18 in one direction and by the inlet pressure in the main valve assisted by the main valve spring 19 in the other direction.

The operation of the main valve is controlled by an auxiliary valve 20 mounted in a plug 21 of common form which is seated at 22 and is threaded into the valve body as shown. The auxiliary valve 20 is provided with a stem 23 which makes a close working fit in a hole centrally of the plug 21 and at its upper end has a nut or button 24. In a recess 25 in the plug 21 is located a light spring 10, which surrounds the stem 23 and tends to close the auxiliary valve 20. The diaphragm 27 which controls the auxiliary valve 20 is subjected on one side to the outlet pressure which is communicated to the chamber beneath the diaphragm by means of a port 28. The upper side of the diaphragm is subjected to the pressure of a spring 29 which bears against a diaphragm button or retainer 30, the spring being regulated in the usual manner by a set screw 31. The auxiliary valve is seated at 32 and controls the passage of steam or other fluid from the inlet passage 15 to the piston 18 through communication ports 33 and 34 the latter being shown in dotted lines.

The auxiliary valve stem 23 necessarily makes a snug working fit in the plug 21 in order to prevent the escape of steam or like fluid through the plug into the low pressure side of the regulator and to insure the passage of steam through the ports 33 and 34 to the under side of the main piston 18. The fit, however, is such that the valve is free to move under very light pressures as is necessary in order that close regulation may be obtained. The auxiliary valve 20 is located in the main passage 15 and has heretofore been subjected to dirt, scale or like impurities contained in the fluid so that the valve has a tendency to stick and its sensitiveness is destroyed. This has rendered it necessary to clean the valve frequently and has caused excessive wear on the parts.

In order to overcome this objection, I provide a strainer consisting of a cup shaped member or housing 35 which is adapted to fit loosely over a portion 36 of the plug 21 and is provided at its upper end with an annular flange 37. At the lower end of the strainer housing 35 is a hole 38 which is surrounded by an annular flange 39. The plug 21 is recessed at 40 in which recess the head of the auxiliary valve 20 is located as shown. At the sides of the recess 40 is a flange 41, and between the flange 41 and the flange 39 of the strainer housing is a strainer disk 42. The annular flange 37 of the housing 35 is adapted to engage with a shoulder 43 on the plug 21. The strainer housing is held securely in place by means of the main valve spring 19 which surrounds the strainer housing 35 and bears at its upper end against the flange 37. The disk 42 is provided with perforations 44, as shown in Fig. 3, of such size that the passage of dirt and other like impurities is prevented and the pressure fluid is clean and free from all such foreign substances when it reaches the auxiliary valve.

This construction is important for the strainer disk is held in position by the main valve spring and no additional connecting member or holding means are required. Furthermore, the parts are readily accessible and may be readily removed and replaced when desired merely by removing the spring case 13 and the plug 21. The strainer is so located in the main fluid passage 15 that it does not interfere with the passage of steam through the main valve 17, and at the same time is subjected to a scouring action by the flow of fluid through the main valve so that an accumulation of dirt or other impurities on the strainer is prevented and a free flow of fluid to the auxiliary valve is provided.

I regard the invention as important for the reliability of an auxiliary operated regulator is greatly increased, greater accuracy of regulation is obtained, and excessive wear and tear on the parts is eliminated.

What I claim is:

1. A pressure regulator comprising a valve body having an inlet and an outlet opening, a partition between said openings having a hole therethrough, a main valve controlling the passage of fluid through said partition, a piston for opening the main valve and a spring for operating it in the other direction which tends to close the main valve, said body having a communication port between said inlet opening and said piston, an auxiliary valve controlling the passage of fluid through said communication port, means for operating said auxiliary valve, and a housing about said auxiliary valve having a strainer therein, said main valve spring being interposed between said main valve and said housing whereby said housing is secured in position.

2. A pressure regulator comprising a valve body, a main valve controlling the passage of fluid through said body, a plug at one side of said main valve, a piston by which said main valve is operated in one direction, a communication port through said plug and valve body whereby the fluid passage through said valve body is connected to the piston, an auxiliary valve located in said plug which controls said port, means for operating said auxiliary valve, a housing which incloses said auxiliary valve and surrounds a portion of said plug and has a hole therein, a strainer disk over said hole, and a main valve spring by which said housing and said strainer disk are held in position.

3. In a regulator of the class described, the combination with a main valve opened by a piston, of a plug located above the main valve, an auxiliary valve located in said plug and controlling the flow of fluid to said piston, a housing surrounding a portion of said plug and having a flange thereon which rests against the same, a strainer disk in said housing, and a spring surrounding said housing and bearing at one end against said flange and at the other end against said main valve and thereby operating to tend to close said main valve and to hold said housing in position.

4. In a regulator of the character described, the combination of a main valve, which is opened by a piston, of an auxiliary valve which controls the flow of steam to said main valve piston, a diaphragm which controls said auxiliary valve, a plug in which said auxiliary valve is located having a recess therein with a flange surrounding the recess, a strainer housing which surrounds said flange, an annular flange on said housing, a strainer disk between said housing flange and said plug flange, and a main valve spring interposed between said housing and said main valve which operates to tend to close said main valve and to hold said housing and strainer disk in position.

In testimony whereof I affix my signature.

GEORGE S. MELCHER.